US005504508A

United States Patent [19]

Hashimoto

[11] Patent Number: 5,504,508

[45] Date of Patent: Apr. 2, 1996

[54] INK RECEIVING CAP, AND INK-JET RECORDING APPARATUS AND INK DISCHARGING METHOD USING THE SAME

[75] Inventor: Kenichiro Hashimoto, Yokohama, Japan

[73] Assignee: Canon Kabushiki Kaisha, Tokyo, Japan

[21] Appl. No.: 140,553

[22] Filed: Oct. 25, 1993

[30] Foreign Application Priority Data

Oct. 30, 1992 [JP] Japan .................................... 4-292639
Aug. 20, 1993 [JP] Japan .................................... 5-206453

[51] Int. Cl.[6] ............................ B41J 2/165; G01D 15/18

[52] U.S. Cl. ................................................ 347/24; 347/31

[58] Field of Search ................................ 347/29, 30, 24, 347/31

[56] References Cited

U.S. PATENT DOCUMENTS

| | | | |
|---|---|---|---|
| 4,313,124 | 1/1982 | Hara | 346/140 R |
| 4,345,262 | 8/1982 | Shirato et al. | 346/140 R |
| 4,459,600 | 7/1984 | Sato et al. | 346/140 R |
| 4,463,359 | 7/1984 | Ayata et al. | 346/1.1 |
| 4,506,277 | 3/1985 | Terasawa | 346/140 R |
| 4,558,333 | 12/1985 | Sugitani et al. | 346/140 R |
| 4,608,577 | 8/1986 | Hori | 346/140 R |
| 4,723,129 | 2/1988 | Endo et al. | 346/1.1 |
| 4,728,970 | 3/1988 | Terasawa | 346/140 R |
| 4,740,796 | 4/1988 | Endo et al. | 346/1.1 |
| 5,086,305 | 2/1992 | Terasawa | 346/1.1 |
| 5,166,708 | 11/1992 | Hirano et al. | 347/24 |
| 5,185,614 | 2/1993 | Courian et al. | 347/29 |

FOREIGN PATENT DOCUMENTS

| | | | |
|---|---|---|---|
| 54-056847 | 5/1979 | Japan . | |
| 59-123670 | 7/1984 | Japan . | |
| 59-138461 | 8/1984 | Japan . | |
| 60-071260 | 4/1985 | Japan . | |
| 0321335 | 1/1991 | Japan | 347/29 |

*Primary Examiner*—Benjamin R. Fuller
*Assistant Examiner*—Valerie Ann Lund
*Attorney, Agent, or Firm*—Fitzpatrick, Cella, Harper & Scinto

[57] ABSTRACT

A cap for capping the single surface of a recording head that is formed with a plurality of groups of ejection holes for inks of different colors so as to maintain an ink-ejectable condition of the recording head has an interior divided into a plurality of spaces individually corresponding to the plurality of ejection hole groups for different-color inks. The spaces include at least a first space corresponding to the ejection hole group for a black ink, and a second space corresponding to the ejection hole groups for yellow, magenta and cyan inks. The plurality of spaces are integrated in a single cap. When an ink-jet recording apparatus includes such a cap, a condition for proper ejection of ink is maintained in the apparatus and requires only a small system.

1 Claim, 8 Drawing Sheets

INK RECEIVING CAP, AND INK-JET RECORDING APPARATUS AND INK DISCHARGING METHOD USING THE SAME

BACKGROUND OF THE INVENTION

1. Field of the Invention

The present invention relates to an ink receiver for capturing the preliminary discharge of ink, and an ink-jet recording apparatus and method for preliminary discharge of ink through ejection holes of the recording head using that receiver.

2. Description of the Related Art

An ink-jet recording apparatus is a type of recording apparatus which effects recording by ejecting ink from a recording head onto a recording medium such as paper. A recording apparatus of this type includes, in addition to a structure directly related to the recording function, an inherent structure for maintaining ink in a stable condition that is fit for ejection.

Since recording data vary, ink may not be ejected through one or more ejection holes for a relatively long period of time, and it is also possible that the entire recording apparatus may not be used for a long period of time. In such cases, some of the water in the ink stored at the ejection holes or within an ink chamber communicating with the ejection holes may evaporate, causing the viscosity of the ink in the apparatus to increase. As a result, ink may not be ejected when necessary. In addition, since the surface of the recording head on which the ejection holes are formed may have ink droplets, ink mist, water droplets and/or dust adhered thereto, the adhered substances may cause, during ejection, ink droplets to be ejected in a direction deviating from the desired direction(s).

In order to avoid these problems, the typical ink-jet recording apparatus has a system, known as an ejection recovery system, for preventing such ejection failures and deviations in the direction of ejection, and thereby maintains the ink in a stable condition fit for ejection through the ejection holes.

Such ejection recovery systems can be of varying construction. For example, an ejection recovery system may be constructed to prevent improper ejection by employing preliminary discharge, ink-suction recovery, ink-pressurization recovery and/or capping. In preliminary discharge, ink is discharged to a certain ink receiver to thereby remove the viscous ink portion, etc. In ink-suction recovery, such removal is effected by using a pump to draw ink out from the ejection holes and the ink chamber. In ink-pressurization recovery, removal is effected by using a pump to pressurize ink so as to force ink out from the ejection holes and the ink chamber. In capping, the surface of the recording head formed with the ejection holes is tightly covered by a cap during the non-recording period so as to prevent the water contained in the ink from evaporating through the ejection holes.

Designing an ink-jet recording apparatus, particularly a small and inexpensive one, involves overcoming many problems.

The main source of these problems is the ejection recovery system. Specifically, reducing the size of the apparatus is limited by the fact that a certain amount of space is necessary to provide devices for preliminary discharge, ink-suction recovery, ink-pressurization recovery and/or capping. Reducing the size of the apparatus is also affected by the need to have space for other related devices such as a waste ink tank for storing waste ink removed by preliminary discharge, suction, etc., and a suction pump and tubes for guiding waste ink into the waste ink tank.

The ejection recovery system has been inevitably very large, especially in the case of an ink-jet recording apparatus adapted for color recording by employing four colors of ink, yellow, magenta, cyan and black. When the ink-jet recording apparatus is the type having independent recording heads for the individual inks, caps, tubes, pumps, and like devices have been provided correspondingly.

However, when independent caps corresponding to the individual recording heads are provided, the positional relationships between the different caps and the corresponding heads may have various levels of precision. As a result, when the caps are brought into contact with the recording heads, tight contact may not be provided as desired.

Such an ink-jet recording apparatus may have a single recording head in which a plurality of groups of ejection holes, for example, four groups of ejection holes for yellow, magenta, cyan and black inks, are formed. A recording head with this construction is advantageous in that it does not require registration between the plural groups of ejection holes, and in that the head has high precision of nozzle pitch, thereby enabling high-quality recording.

When this recording-head construction is adopted, however, the distance between two adjacent groups of ejection holes cannot be increased beyond the limits achievable by various manufacturing processes. The inter-group distance is, for example, 1 mm, which is a relatively small dimension. When the inter-group distance is increased in spite of manufacturing process limitations, the surface of the recording head with the ejection holes formed therein may become too long to maintain a prescribed gap between the surface of the recording head having ejection holes therein and the recording medium such as paper. Thus, it is inappropriate to increase the distance between the groups of the ejection holes.

When such a single recording head is combined with a plurality of caps corresponding to the individual groups of ejection holes for the purpose of achieving tight head-cap contact, the relatively short distance between two adjacent groups makes it difficult to simultaneously bring the outer wall portions of two adjacent caps into tight contact with an inter-group portion of the recording head. As a result, an ink sucking operation may not be performed properly.

In order to overcome this problem, some of the caps and other related devices may be provided in common. However, the adoption of this arrangement may involve the following problems:

①0 During the replacement of an ink tank holding one of several colors of ink, an ink sucking operation is performed to remove bubbles which have entered into the path between the ink tank and the recording head, as well as to prime the recording head with ink from the ink tank. In this operation, however, ink is simultaneously sucked from both the ejection holes connected with the relevant ink tank and the ejection holes connected with other ink tanks by paths which need not be cleared. As a result, the total amount of waste ink increases over the amount produced by an ejection recovery system with no common elements. Some ink in the ink tanks not meant to be cleared has to be wasted, and the increased total volume of waste ink requires use of a larger waste ink tank. It is very important to achieve a high efficiency of ink use particularly in a small apparatus which cannot be equipped with a large ink tank device.

② When ink is being cleared, other bits of ink adhering to the vicinity of the ejection holes of the recording head after ejection therethrough are diffused in the flow of ink being cleared, causing ink of a color having a relatively high density, such as black ink, to be mixed with ink of a color having a relatively low density, such as yellow. The thus-formed mixture may enter ejection holes for an ink having a relatively low-density color, such as yellow. As a result, a mixed color ink, which is darker than the yellow ink that should be ejected, may be ejected in actual recording.

SUMMARY OF THE INVENTION

An object of the present invention is to reduce the size of a system for discharging ink for the purpose of maintaining the ability to properly eject ink through the ejection holes of a recording head.

Another object of the present invention is to perform an ink discharging operation in such a manner as to eliminate unnecessary ink waste and prevent ink mixing at the ejection holes.

A further object of the present invention is to provide an ink-jet recording apparatus for recording by ejecting ink onto a recording medium from a recording head having plural groups of ejection holes. The recording head is of the multi-ink type, and has an ejection-hole formed surface. The apparatus includes ink receiving means reciprocably mounted for contacting and separating from the ejection-hole formed surface of the recording head on which the ejection holes are formed, so that the ink receiving means can capture ink discharged through at least some of the ejection holes. The ink receiving means includes plural ink receiving sections defining plural distinct and isolated spaces when the ink receiving means is positioned so as to contact the ejection-hole formed surface of the recording head. The ink receiving sections are positioned so that adjacent ink receiving sections are isolated from each other by a single isolating member dimensioned so as to contact the ejection-hole formed surface of the recording head when the ink receiving means contacts the ejection-hole formed surface.

A still further object of the present invention is to provide a method for discharging ink through plural ejection holes of a recording head, the ejection holes being divided into plural groups, the recording head being of a multi-ink type. The method includes the steps of providing ink receiving means for receiving ink discharged through a selected group of the ejection holes of the recording head, and the ink receiving means includes plural ink receiving sections defining plural distinct and isolated spaces when the ink receiving means is positioned so as to contact an ejection-hole formed surface of the recording head on which the ejection holes are formed. The ink receiving sections are positioned so that adjacent ink receiving sections are isolated from each other by a single isolating member dimensioned so as to contact the ejection-hole formed surface of the recording head when the ink receiving means contacts the ejection-hole formed surface. The method also includes bringing the ink receiving means into contact with the ejection-hole formed surface of the recording head, and discharging ink through selected ejection holes of the recording head.

Yet a further object of the present invention is to provide an ink receiver for receiving ink discharged through a selected group of ejection holes of a recording head, the recording head having plural ejection holes which are divided into a plurality of these groups. The ink receiver includes plural ink receiving sections defining plural distinct and isolated spaces when the ink receiver is positioned so as to contact an ejection-hole formed surface of the recording head on which the ejection holes are formed. The ink receiving sections are positioned so that adjacent ink receiving sections are isolated from each other by a single isolating member dimensioned so as to contact the ejection-hole formed surface of the recording head when the ink receiver contacts the ejection-hole formed surface.

With the foregoing invention, when an ink discharging operation is performed to maintain the ability to properly eject ink through a plurality of groups of ejection holes communicating with a plurality of different ink tanks, discharged ink is received by a cap which is capable of receiving one of several different types of inks independently of the other inks, even though the cap is an integral structure. Thus, the inks which are not being cleared by the ink discharging operation are saved from being consumed by the operation, thereby preventing unnecessary-ink waste. Furthermore, it is possible to prevent ink mixing at the ejection holes.

DETAILED DESCRIPTION OF THE PREFERRED EMBODIMENTS

The present invention will now be described in detail with reference to the accompanying drawings.

Figure 6:
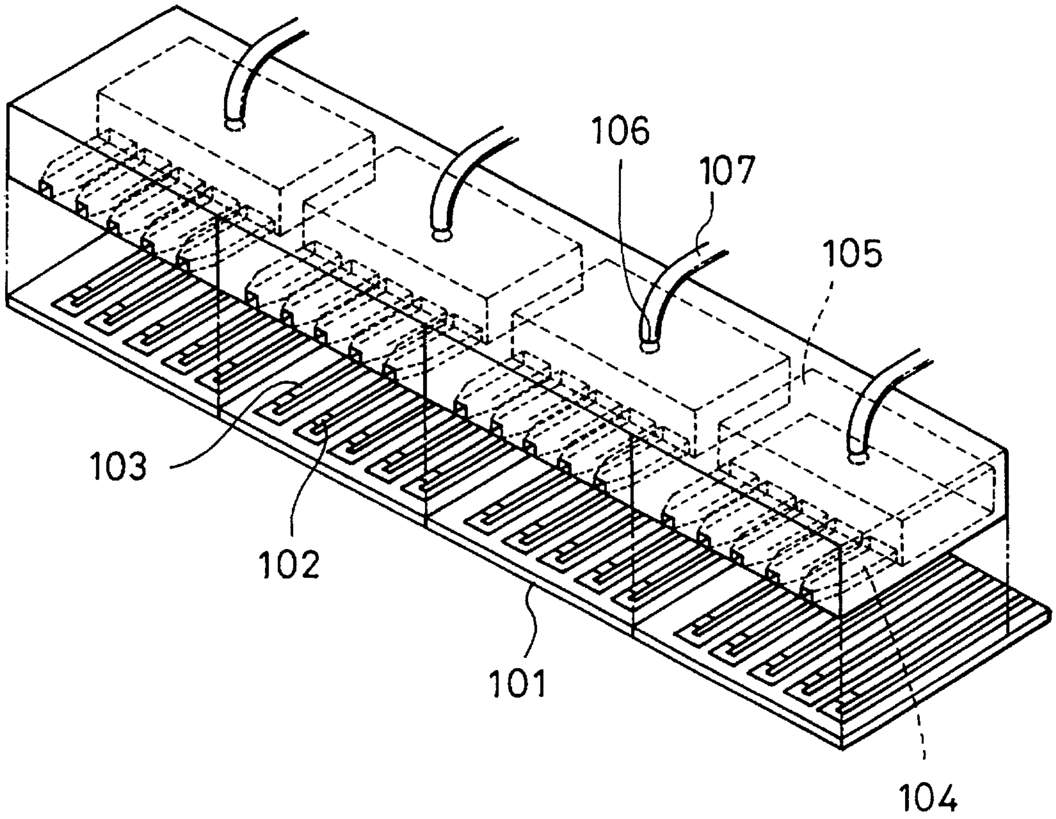
FIG. 6 is a perspective view of a recording head which may be advantageously combined with a recovery system according to the present invention.

FIG. 6 shows a recording head which may be combined with a cap serving as an ink receiving means of a recovery system according to the present invention.

The recording head has a substrate 101. Heat-generating resistors 102, electrodes 103, protective layers (not shown), and the like are subsequently formed on the substrate 101 by a suitable manufacturing technique, such as sputtering, chemical vapor deposition (CVD) or the electron beam (EB) method. Nozzles 104 and an ink chamber 105 are formed on the resultant structure by a photo-etching method. The ink chamber 105 is divided into a plurality of sub-chambers (four sub-chambers, in the illustrated example) each communicating with the desired number of nozzles 104. An ink supply port 106 is formed in the upper surface of each sub-chamber for supplying ink from an ink tank (not shown) through an ink supply tube 107.

The four sub-chambers of the ink chamber 105 are connected with separate ink tanks, each such ink tank containing a different color ink, such as yellow, magenta, cyan and black, so that inks of such colors can be ejected through the nozzles 104 communicating with the sub-chambers.

As shown in FIG. 6, the lower structure including the substrate 101 and the upper, photo-etched structure including the nozzles 104 and the ink chamber 105 are depicted as being separated; in fact, these structures are formed integrally.

Figure 7:
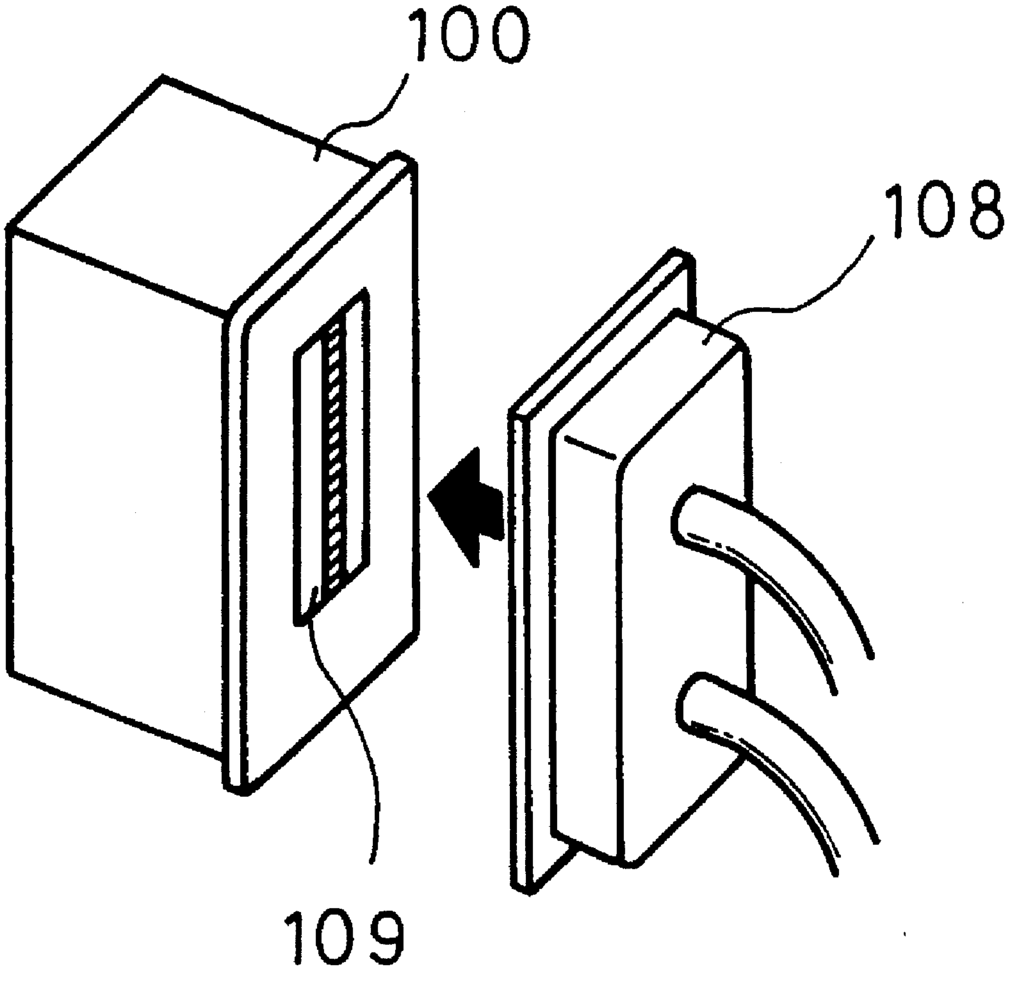
FIG. 7 is a perspective view showing the positional relationship between a recording head and a cap used according to the present invention.

FIG. 7 shows, in a perspective view, a recording head 100 having the above construction and a cap 108. As will be seen from FIG. 7, when the cap 108 is brought into tight contact with an ejection-hole formed surface 109 of the recording head 100, on which ejection holes are formed, by moving the cap 108 in the direction indicated by arrow in the drawing, the entire ejection-hole formed surface 109 is covered by the cap 108 with a peripheral portion of the surface 109 contacting a peripheral portion of the cap 108. When the cap 108 thus contacts the recording head 100, the interior of the cap 108 defines, in cooperation with the surface 109 of the recording head 100, a space completely surrounding the ejection holes.

(First Embodiment)

A first embodiment of the present invention will be described with reference to FIGS. 1 and 2.

A cap 1 serving as an ink receiving means is formed by using an elastic material, such as rubber, for at least a portion which is to be brought into tight contact with a recording head 100 so that, during capping, the cap 1 elastically and tightly contacts a peripheral portion of the ejection-hole formed surface of the recording head 100. The cap 1 includes a pair of separate ink receiving sections, that is, cap sections **2*a* and 2*b* for respectively receiving color ink and black ink discharged in a recovery operation. An isolating rib 6, serving as a common isolating means, is formed between the cap sections 2*a* and 2*b* in such a manner as to be capable of contacting the ejection-hole formed surface of the recording head 100, so that these sections 2*a* and 2*b* are isolated from each other when the ejection-hole formed surface of the recording head 100 is capped. The cap 1 also includes a peripheral rib 5 formed on the peripheral edge of the cap sections 2*a* and 2*b* for tightly contacting a peripheral portion of the ejection-hole formed surface of the recording head 100**.

The interior of each cap section **2*a* or 2*b* serves as a suction space communicating with a corresponding suction tube 4*a* or 4*b*. Waste ink absorbers 3*a* and 3*b* are individually disposed in the suction spaces so that ink droplets discharged into the suction spaces can be absorbed by the associated absorber 3*a* or 3*b*. When the cap 1 contacts the ejection-hole formed surface of the recording head, the suction spaces constitute spaces 1*a* and 1*b* of the cap 1** which spaces are mutually isolated.

The recording head 100 has a plurality of groups of ink ejection holes (generically denoted by reference numeral 110). As shown in FIG. 2, the plurality of groups of ejection holes comprise a group of ejection holes 110Y for ejecting yellow ink, a group of ejection holes 110M for ejecting magenta ink, a group of ejection holes 110C for ejecting cyan ink, and a group of ejection holes 110K for ejecting black ink, the ejection hole groups 110Y to 110K being arranged in this order seen from above. Adjacent ejection hole groups are separated from each other by a distance greater than the pitch at which ejection holes in each group are formed.

When the ejection-hole formed surface of the recording head 100 is capped by the cap 1, the isolating rib 6, serving as the common isolating means, contacts a portion of the ejection-hole formed surface which is between the cyan ink ejection hole group 110C and the black ink ejection hole group 110K. As a result, a portion of the ejection-hole formed surface which is formed with the ejection hole groups 110Y, 110M and 110C for respectively ejecting yellow, magenta and cyan inks and another portion of the ejection-hole formed surface which is formed with the ejection hole group 110K for ejecting a black ink are tightly sealed by the cap sections **2*a* and 2*b***, respectively, and are thus closed independently.

An ink-jet apparatus according to this embodiment includes two ink-tank units, one for black ink and the other for color inks, e.g., yellow, magenta and cyan inks. This is done so that when recording is performed in either monochromatic printing mode or color printing, the mode being arbitrarily selected by the user, black ink is consumed at a higher rate than the color inks (i.e., yellow, magenta and cyan inks) and so the inks are consumed at substantially the same rate. Therefore, when providing ink tanks as two ink-tank units, the ink tank for black ink, which is consumed at a relatively high rate, can be replaced independently, and the ink tank for color inks, such as yellow, magenta and cyan inks, can be replaced simultaneously. Thus, it is possible to reduce the number of times at which replacement is needed, and to reduce the amount of ink wasted.

The suction tubes **4*a* and 4*b*, communicating with the corresponding suction spaces, are connected to a valve assembly 7, which assembly is connected through a pump tube 8 to a pump (not shown). The valve assembly 7 includes a cylinder 9 and a piston 10. The cylinder 9 has a pair of suction tube ports 7*a* and 7*b*, and a pump tube port 7*c*. Upper and lower O-rings or seals 10*a* and 10*b* are mounted on the piston 10 for switching the connection between the pump tube port 7*c* and one of the suction tube ports 7*a* and 7*b* when the piston 10 moves vertically in the cylinder 9. The piston 10** moves vertically in accordance with the driving of a motor (not shown) or the like.

Figure 3:
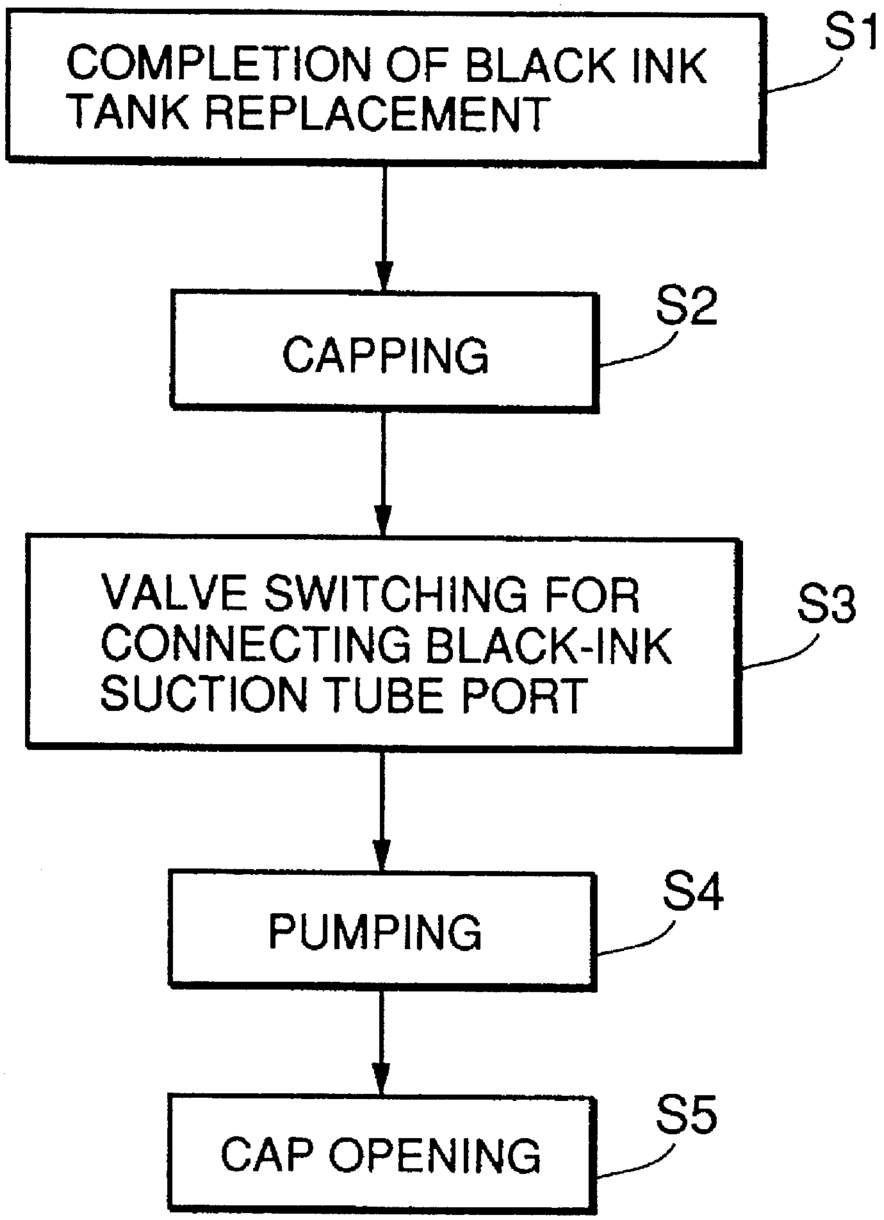
FIG. 3 is a flowchart showing the operation of the recovery system according to the first embodiment.
Figure 4A:
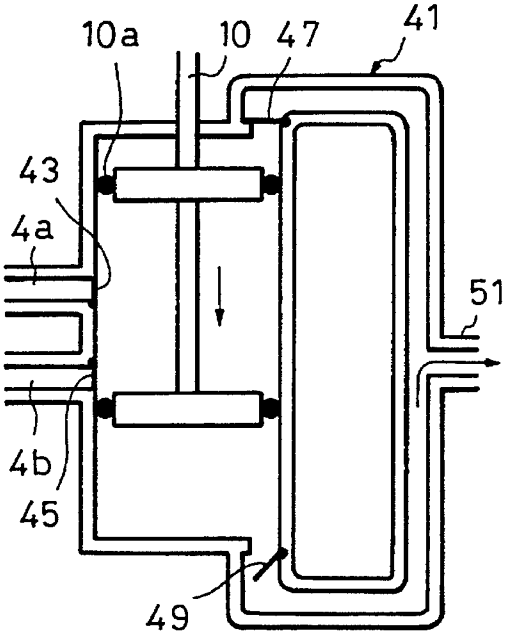
FIGS. 4(*a*) to 4(*d*) are sectional views of a valved pump which may be incorporated in the recovery system according to the first embodiment.
Figure 4B:
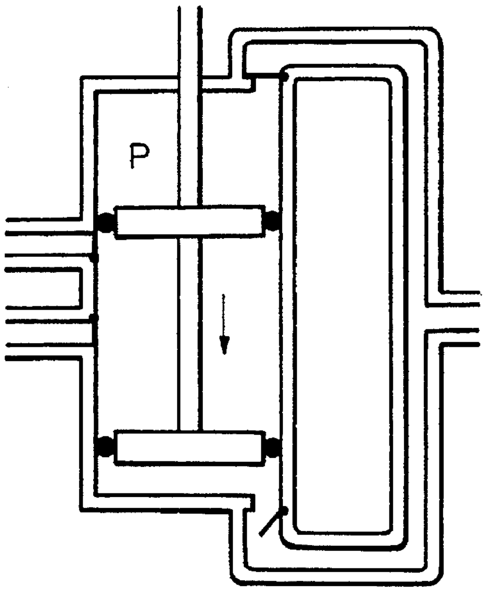
Figure 4C:
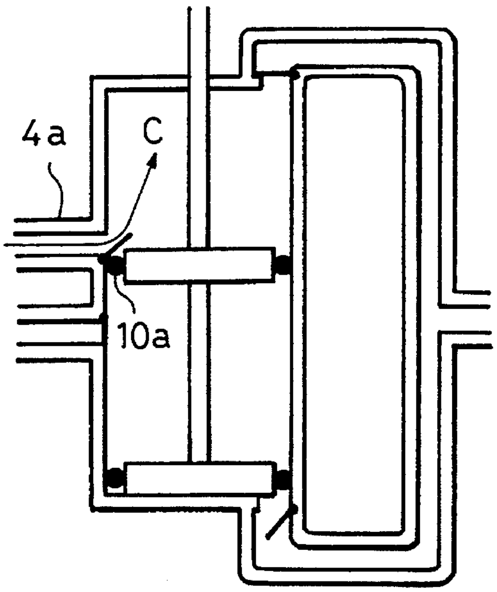
Figure 4D:
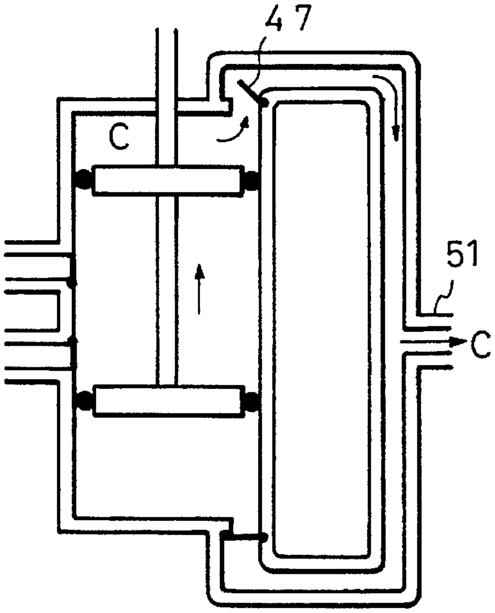

An actual recovery operation will be described in detail with reference to the flowchart provided in FIG. 3.

When the operator has replaced the color ink tank unit or the black ink tank unit, the operator depresses a corresponding tank replacement key (not shown) so as to inform the apparatus of the completion of tank replacement. The flowchart shows an example in which a tank replacement key corresponding to a black ink tank unit is depressed after replacement thereof (step S1). Subsequently, the recording apparatus performs a capping action to tightly close the ejection-hole formed surface of the recording head 100 with the cap 1 (step S2). Then, the piston 10 is moved in the cylinder 9 in such a manner as to connect the relevant suction tube port of the valve assembly 7, i.e., the black-ink suction tube port **7*b* in this example, with the pump tube port 7*c* of the valve assembly 7 (step S3**).

Thereafter, the pump is driven to perform pumping so that, after black ink has been drawn into nozzles corresponding to the black ink ejection holes 110K, black ink is discharged through the black ink ejection holes 110K (step S4). Discharged ink is received in the cap 1. In step S5, from the state in which the interior of the cap 1 and the suction tube **4*b* is still negatively pressurized, the cap 1 is opened, thereby causing the ink in the cap 1 to be sucked through the suction tube 4*b* toward the pump (step S5). In step S5, an atmospheric pressure introduction valve may be provided in the cap 1 so that ink in the cap 1 can be sucked by opening that valve while the cap 1** remains in its capping position.

A recovery operation for color inks may be performed in a similar manner after the color ink tank unit has been replaced.

Figure 1:
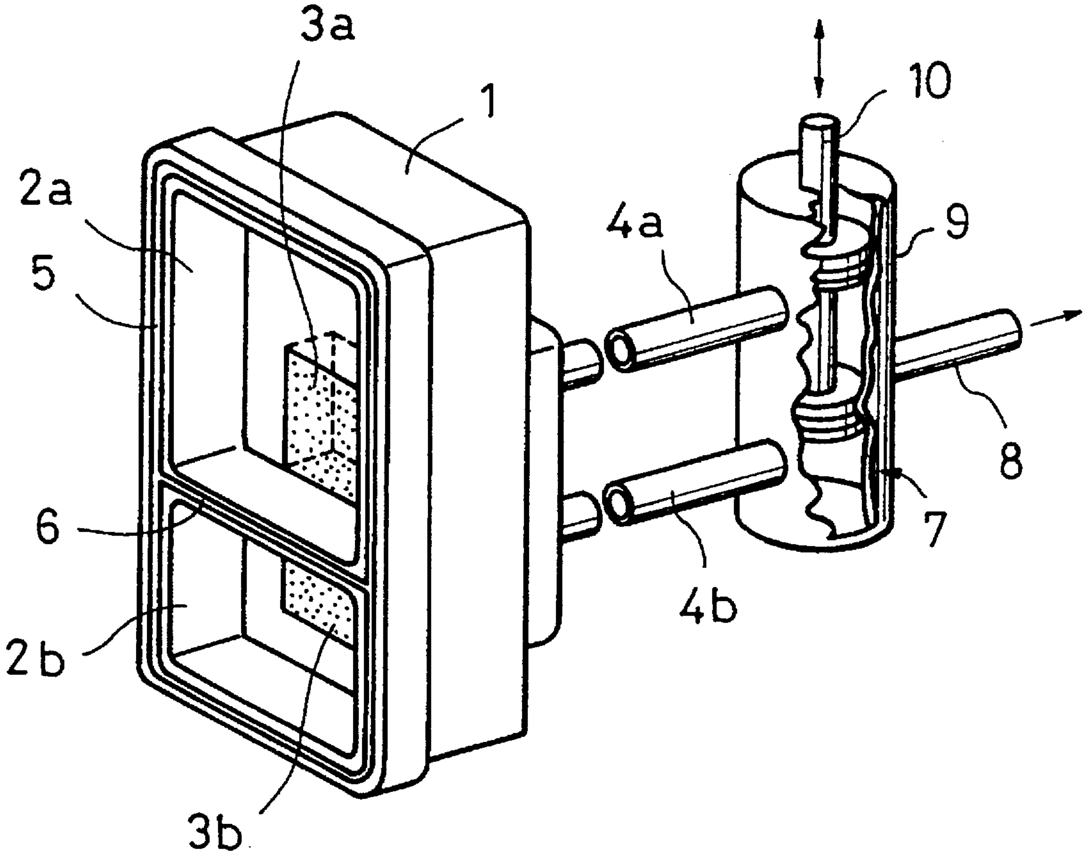
FIG. 1 is a partially cut-away perspective view of the essential parts of a recovery system according to a first embodiment of the present invent ion.
Figure 2:
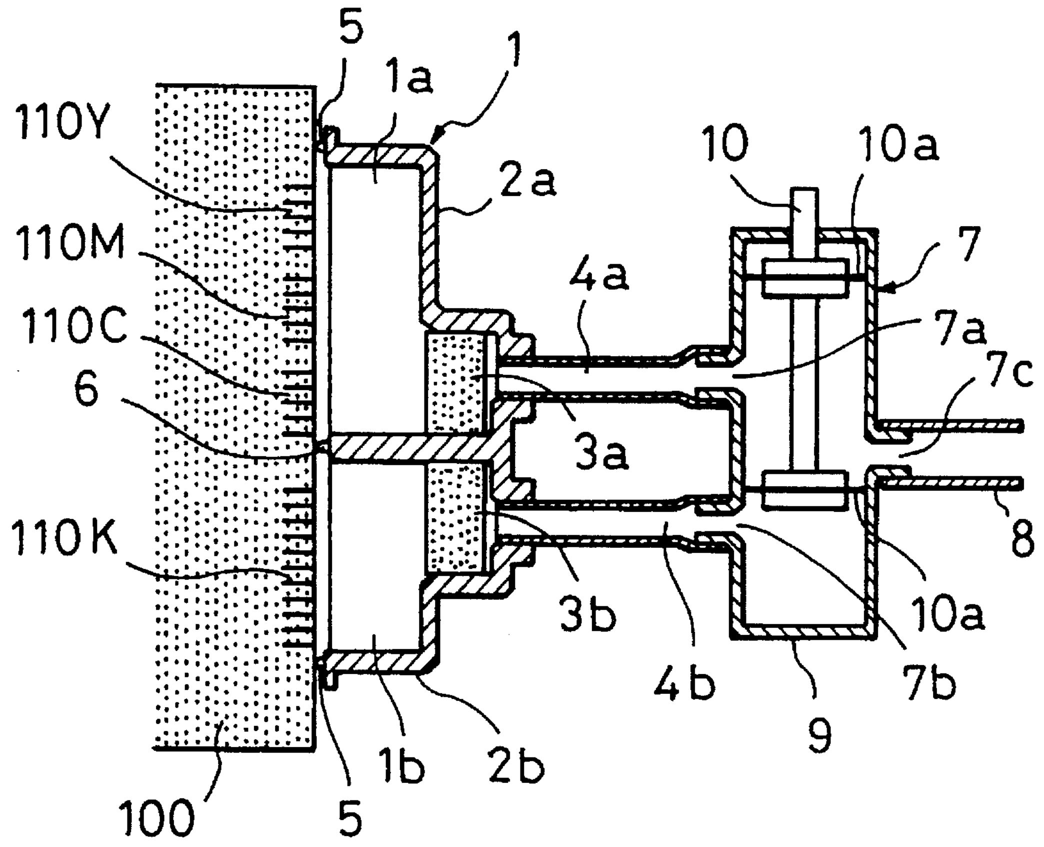
FIG. 2 is a sectional view of the essential parts of the recovery system according to the first embodiment.

As shown in FIGS. 1 and 2, the waste ink absorber 3*a* in the cap section 2*a* for receiving discharged color ink and the associated suction tube 4*a* are disposed at a location facing the cyan ink ejection holes 110C. In a color-ink sucking operation, therefore, cyan ink flows directly to these ejection holes 110C, and is thus prevented from flowing toward the yellow ink ejection holes 110Y. As a result, the risk of cyan ink adhering to and remaining in the vicinity of the yellow ink ejection holes 110Y is reduced. Accordingly, the risk that mixed color ink may be ejected from the yellow ink ejection holes 110Y is reduced.

Thus, this embodiment has certain arrangements for capping a plurality of groups of color-ink ejection holes with a single cap. That is, a waste ink absorber and a suction tube, both for color ink discharged during a recovery operation, are disposed at a location corresponding to color-ink ejection holes for ejecting a color ink with a relatively high density. This arrangement is combined with an arrangement in which the ejection holes for ejecting a color ink with a relatively high density, e.g., a cyan ink, are formed relatively far from the ejection holes for ejecting a color ink with a relatively low density, e.g., a yellow ink, thereby further reducing the risk of the unwanted mixing of inks.

A recovery system according to the present invention may have a construction shown in FIGS. 4(*a*) to 4(*d*), in which the valve assembly 7 and the pump are integrated into a valved pump 41. The valved pump 41 has valves 43, 45, 47 and 49, and an exhaust port 51. The operation of the valved pump 41 will be described with reference to FIGS. 4(*a*) to 4(*d*) in connection with a recovery operation in which color ink is suction-discharged.

First, a piston 10 starts descending, as indicated by arrow in FIG. 4(*a*).

As the piston 10 moves further downward, as shown in FIG. 4(*b*), the internal pressure of the valved pump 41 in an upper space P above the piston 10 decreases to a negative pressure.

When, as shown in FIG. 4(*c*), an O-ring seal 10*a* provided at an upper position of the piston 10 moves downward past the opening of a suction tube 4*a*, the valve 43 is opened, connecting the suction tube 4*a* with the space above the piston 10 where negative pressure prevails. This connection allows color waste ink C to be drawn through the suction tube 4*a* into the valved pump 41, as indicated by arrow in FIG. 4(*c*).

Thereafter, when the piston 10 moves upward, as shown in FIG. 4(*d*), the valve 47 is opened, so that color waste ink C is forced through the open valve 47 to be forced out through the exhaust port 51, as indicated by the associated arrows in the drawing. The cleared color waste ink is absorbed by a waste ink absorber, not shown.

When suction-discharging black ink, a similar operation is performed employing the reverse movement of the piston 10 and the other valves 45 and 49.

With the construction shown in FIGS. 4(*a*) to 4(*d*), since the valve assembly and the pump are integrated, it is possible to further reduce the size of the apparatus.

(Second Embodiment)

Figure 5:
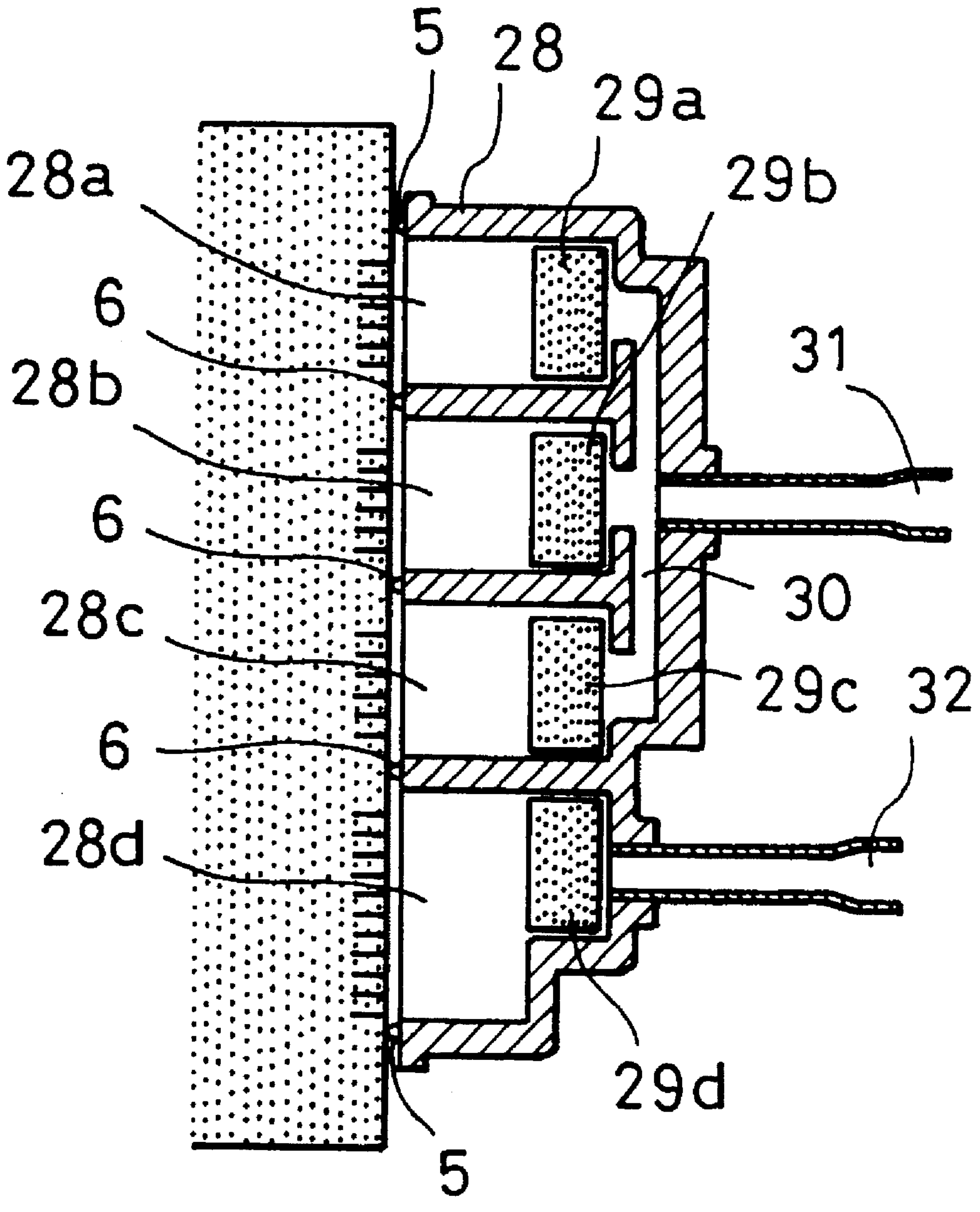
FIG. 5 is a sectional view of parts of a recovery system according to a second embodiment of the present invention.

FIG. 5 shows a second embodiment of the present invention. In FIG. 5, components corresponding to those of the first embodiment are denoted by corresponding reference numerals. The second embodiment is distinguished from the first embodiment in that a cap has a color-ink cap section which is divided into a plurality of sub-sections, each sub-section for receiving one of a plurality of color inks, so that inks are completely prevented from mixing. Thus, when the cap is capping the ejection-hole formed surface of the associated recording head, the interior of the cap defines a plurality of spaces, for example, four spaces comprising a first space 28*a* for receiving yellow ink, a second space 28*b* for receiving magenta ink, a third space 28*c* for receiving cyan ink and a fourth space 28*d* for receiving black ink. A plurality of ribs 6 are provided so that, in a capping position of the cap, adjacent spaces are isolated from each other by the ribs 6 which serve as a common isolating means.

Accordingly, when color inks are discharged by suction, they are prevented from mixing with each other in the interior of the cap or at the ink-ejection holes. All four spaces, isolated in correspondence with the four colors, communicate with a common space 30 so that the cleared yellow, magenta and cyan inks are simultaneously sucked through a suction tube 31. Another suction tube 32 is used to suction-discharge black ink.

In the second embodiment, a plurality of color waste ink absorbers 29*a* to 29*c* are provided in the individual sub-spaces, as shown in FIG. 5. Therefore, though color inks may be mixed in the suction tube 31, mixed color ink is prevented from flowing back into the sub-spaces even if ink backflow occurs during a pump operation, thereby preventing the adhesion of mixed color ink to the ejection holes.

(Third Embodiment)

Figure 8A:
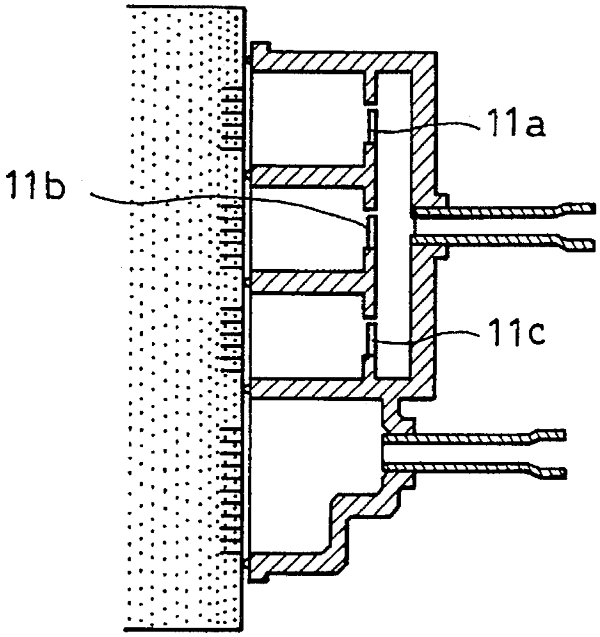
FIGS. 8(*a*) and 8(*b*) are sectional views of parts of a recovery system according to a third embodiment of the present invention.
Figure 8B:
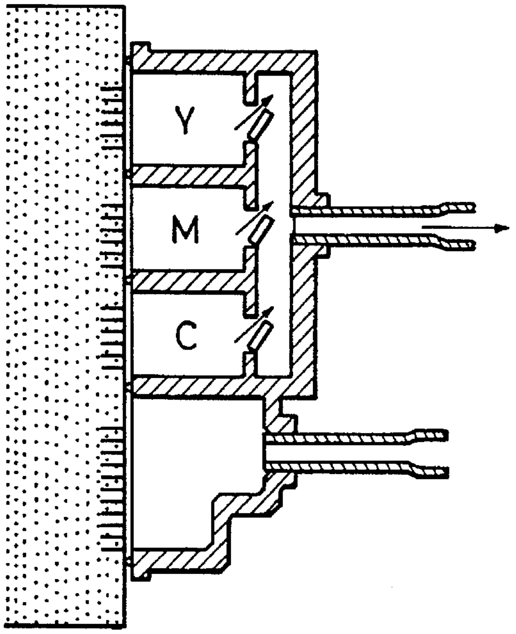

A third embodiment of the present invention will be described with reference to FIGS. 8(*a*) to 8(*b*). Components of the third embodiment which correspond to those of the second embodiment will not be described. The third embodiment is distinguished from the second embodiment in that the color waste ink absorbers 28*a*, 28*b* and 28*c* are replaced by valves 11*a*, 11*b* and 11*c* integral with a cap. Normally, the valves 11*a* to 11*c* are closed, as shown in FIG. 8(*a*). During a color ink clearing operation, the valves 11*a* to 11*c* are opened in the direction of suction, as indicated by arrows in FIG. 8(*b*), so as to allow the color inks to flow therethrough. When the ink suction is completed, the valves 11*a* to 11*c* are again closed to prevent backflow of mixed color ink, and hence, to prevent entrance of mixed ink into the sub-spaces.

Although in the above-described embodiments, the present invention is employed when different color inks are used, this is merely an example, and the present invention may be applied to cases where different types of inks are used, for example, where a pigment ink and a dye ink, or inks of different densities, are used.

with each of the foregoing embodiments, since a plurality of ink receiving sections are integrally formed in a single cap, it is possible to reduce variations in the precision of the cap-head positional relationship caused when a plurality of heads are combined with a plurality of caps. Thus, it is possible to achieve excellent tight contact between a cap and a recording head.

A recording head may be the type having a plurality of groups of ejection holes for ejecting inks of different colors, such as yellow, magenta, cyan and black, formed in a single recording-head structure. The present invention provides, also for such a recording head, an ink receiver having a plurality of spaces mutually isolated by common isolating means capable of contacting the surface of the recording head formed with the ejection hole groups. Thus, even when the relevant recording head is of the above type and, accordingly, has a relatively small distance between adjacent groups of ejection holes, a partition wall forming a part of the cap and providing a common isolating means can be brought into tight contact with a portion of the ejection-hole formed surface between adjacent ejection hole groups, thereby enabling reliable ink-clearing operations. When combined with the present invention, therefore, the above type of recording head can be fully and advantageously used.

When the ink receiving spaces are thus provided independently in correspondence with the individual ejection hole groups, this is advantageous in that only the associated type of ink can be sucked and discharged. Accordingly, it is possible to minimize the amount of unwanted-ink waste. The total amount of ink waste can also be reduced, enabling a reduction in the size of the waste ink tank.

The provision of independent ink receiving spaces in correspondence with a plurality of ejection hole groups may be such that the ejection hole group for ejecting an ink of a color with a relatively high density, such as black ink, corresponds to a different ink receiving space from the space to which the ejection hole group for ejecting ink of a color with a relatively low density, such as yellow ink, corresponds. In this way, it is possible to prevent a relatively high-density color ink from diffusing into the ejection holes for a relatively low-density color, and hence, insure ejection of ink of the intended color.

The present invention provides excellent results particularly when applied to certain ink-jet recording heads and ink-jet recording apparatuses employing, among various ink-jet recording methods, a method utilizing thermal energy for forming ink droplets which are ejected to perform recording.

The principles and typical constructions of that ink-jet recording method are disclosed, for example, in U.S. Pat. Nos. 4,723,129 and 4,740,796. An ink-jet recording method based on such fundamental principles is preferably used in the present invention. Such a method may be either of the so-called on-demand type or the continuous type. However, an on-demand type method is particularly preferable. In this method, at least one driving signal, corresponding to recording information and capable of causing a rapid increase in temperature exceeding the nucleate boiling temperature, is applied to electrothermal energy conversion elements arranged in correspondence with sheets and ink flow passages where ink is retained. Thus, thermal energy is generated by electrothermal energy conversion element(s) so as to cause film boiling on the heat application surface of the recording head. As a result, bubbles are formed in the ink in one-to-one correspondence with the driving signal. The bubbles are driven to grow and contract to cause ink to be ejected through ejection hole(s), thereby forming at least one ink droplet.

More preferably, the driving signal is pulse shaped so that growth and contraction of bubbles occur promptly and appropriately, thereby enabling ink ejection to be performed with good response characteristics. Suitable examples of pulse-shaped driving signals are disclosed, for example, in U.S. Pat. Nos. 4,463,359 and 4,345,262. If the temperature raising ratio on the heat application surface is conditioned as described in U.S. Pat. No. 4,313,124, it is possible to perform even more excellent recording.

The recording head may have a construction in which ejection holes, ink flow passages and electrothermal energy conversion elements, such as those described in the above-identified documents, are combined together (the ink flow passages may be either rectilinear or right-angled). The recording head may have heat application portions formed in a bent region, as disclosed in U.S. Pat. Nos. 4,558,333 and 4,459,600.

The recording head may additionally have a construction in which a slit common to a plurality of electrothermal energy conversion elements serves as an ejection portion, as disclosed in Japanese Pat. Laid-Open No. 59-123670, or a construction in which an opening for absorbing a pressure wave of heat energy corresponds to an ejection portion, as disclosed in Japanese Pat. Laid-Open No. 59-138461.

The recording head may be of the full-line type in which the recording device has a length corresponding to the maximum possible width of a recording medium. Such a full-line type recording head may be obtained by constructing one or more recording heads, such as those disclosed in the above-identified references, into an integral structure consisting of a single recording head or a combination of a plurality of recording heads.

In addition, the recording head may be a chip-type head which is replaceable and can be electrically connected to the body of the apparatus and be supplied with ink therefrom when mounted on the body. Also, a cartridge-type recording head having a body and an ink tank device integrally provided on the body may be used.

A recording apparatus according to the present invention may be capable of recording in various modes besides a mode for recording using a main color, such as black. That is, the apparatus may be also capable of effecting multi-color recording using different colors, or full-color recording obtained by color-mixing, or both. The second type of mode may employ either a recording-head construction comprising a single recording head forming an integral structure, or a construction comprising a plurality of recording heads combined together.

In the foregoing embodiments, ink is described as being liquid. Another ink which may be used in the present invention is an ink which solidifies at or below room temperature and softens at room temperature, or an ink which remains a liquid, or an ink which is in a liquid state when a recording signal is applied since, in general, in carrying out the above-described ink-jet recording method, an ink itself is adjusted to a temperature range from 30° to 70° C. in such a manner that the viscosity of the ink falls within a stable ejection range thereof.

An ink which liquefies only after the application of thermal energy may be used in the present invention. For example, an ink which is liquefied when thermal energy is applied in accordance with a recording signal so that the ink can be ejected as a liquid ink, or an ink which starts solidifying when the ink has reached a recording medium, may be used. An arrangement for realizing liquefaction may be either one in which an increase in temperature that can be caused by thermal energy is prevented by positively using the thermal energy as energy for transforming the ink from a solid state to a liquid state, or another arrangement which uses an ink that solidifies when it is held stationary for the purpose of preventing evaporation of water from the ink. An ink, such as above, may be provided by retaining the ink in its liquid or solid state in recesses or holes of porous sheets, and opposing ink-retaining structures to electrothermal energy conversion elements, as disclosed in Japanese Pat. Laid-Open No. 54-56847 and 60-71260. The use of an ink described above is most effective when combined with the above-described method in which film boiling is caused.

A recording apparatus according to the present invention may be an image output terminal which is either integral with or separate from an information processor such as a word processor or a computer. The recording apparatus may be in another form such as a copying machine combined with a reader, or a facsimile apparatus having transmitting and receiving functions.

What is claimed is:

1. An ink-jet recording apparatus for recording by ejecting an ink onto a recording medium from a recording head having a plurality of groups of ejection holes in a surface thereof, each of said groups being capable of ejecting a different kind of ink, said apparatus comprising ink receiving means for receiving ink discharged through said ejection holes, wherein:

said ink receiving means is reciprocally mounted for contacting and separating from said surface and comprises a plurality of ink receiving sections, at least one of said sections being separated from another of said sections by a single isolating member dimensioned for contacting and separating from said surface as said ink receiving means reciprocates, said sections define upon contact of said ink receiving means with said surface of plurality of spaces, each said space covering a different one of said groups of ejection holes, a plurality of said sections are connected to a single ink sucking means for selectively sucking at least one of said groups of said ejection holes, and said plurality of said sections are connected to said ink sucking means through ink backflow preventing means for reducing unwanted mixing of different kinds of inks, said ink backflow preventing means being an ink absorber.

* * * * *

UNITED STATES PATENT AND TRADEMARK OFFICE

CERTIFICATE OF CORRECTION

PATENT NO. : 5,504,508

DATED : April 2, 1996

INVENTOR(S) : KENICHIRO HASHIMOTO

It is certified that error appears in the above-indentified patent and that said Letters Patent is hereby corrected as shown below:

COLUMN 2

Line 51, "0" should be deleted.

COLUMN 4

Line 19, "unnecessary-ink" should read --unnecessary ink--.

Line 27, "invent ion;" should read --invention;--.

COLUMN 8

Line 51, "with" should read --With--.

COLUMN 12

Line 4, "of plurality" should read --a plurality--.

Signed and Sealed this

Third Day of September, 1996

Attest:

BRUCE LEHMAN

*Attesting Officer* *Commissioner of Patents and Trademarks*